United States Patent Office 3,644,603
Patented Feb. 22, 1972

3,644,603
METHOD OF MAKING 2-AMINOETHYL PHOSPHATE
Perttu V. Laakso, Barrington, Ill., assignor to The Kendall Company, Boston, Mass.
No Drawing. Filed Dec. 30, 1968, Ser. No. 788,031
Int. Cl. C07f *9/08*
U.S. Cl. 260—978    4 Claims

ABSTRACT OF THE DISCLOSURE

Method of making 2-aminoethyl phosphate in high yield by evaporating the water of solution from an aqueous mixture of 2-aminoethanol and orthophosphoric acid in equimolar proportions at a temperature not over 110° C., then heating gradually to a temperature of 150–210° C. at reduced pressure to remove an equimolar proportion of water of reaction.

---

This invention relates to a method of making 2-aminoethylphosphate by reacting 2-aminoethanol with an aqueous solution of orthophosphoric acid.

It has hitherto been proposed, for example in Ferrari et al. U.S. Pat. 2,730,542, to make 2-aminoethyl phosphate by heating an aqueous solution of 2-aminoethanol with an aqueous solution of orthophosphoric acid under vacuum at 185° C. for about three hours. However, such a process has been reported to produce only 90–95% yield of the desired product.

It has now been discovered that a yield of essentially 100% of the theoretical amount of the desired product can be obtained by carrying out the process in accordance with the present invention and with the following equation:

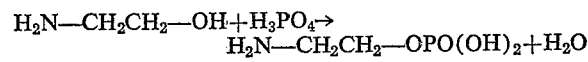
$$H_2N-CH_2CH_2-OH + H_3PO_4 \rightarrow$$
$$H_2N-CH_2CH_2-OPO(OH)_2 + H_2O$$

During the first step of the process of the present invention, 2-aminoethanol, either anhydrous or in the form of an aqueous solution if desired, is mixed together with an aqueous solution containing an equimolar proportion of orthophosphoric acid while maintaining the temperature no higher than about 110° C. In a batch operation, preferably the desired total amount of orthophosphoric acid to be reacted is placed in a container and into it there is introduced, with constant stirring, the equimolar amount of 2-aminoethanol solution, the rate of introduction of the latter being controlled so as to prevent the temperature of the mixture from rising above 110° C. as a result of the heat of reaction, i.e., the heat of neutralization. It is generally preferred to use an 85% aqueous solution of orthophopshoric acid because of its ready availability, although solutions of any other desired concentration, even as low as 50%, may be used if desired; aqueous solutions of 2-aminoethanol of like concentrations may also be used if desired although there is generally no advantage in doing so since this material is readily available in anhydrous form and there is no economic advantage in using an aqueous solution instead of the anhydrous material. After the mixing is complete, there is removed from the mixture the water of solution, this removal being accomplished without permitting the temperature of the mixture to rise above 110° C. The pressure may be reduced during this step, preferably to a pressure below 10 millimeters of mercury, to facilitate water removal if desired, and in addition, the mixture may be heated but these features are not essential. After removal of the water, there remain only the 2-aminoethanol and the orthophosphoric acid in stoichiometric proportions; if cooled to room temperature, the mass crystallizes to a solid having a melting point of approximately 84–86° C. The solid is the 2-aminoethanol salt of orthophosphoric acid.

In a subsequent step, following removal of the water of solution, the esterification reaction is caused to occur and the water of reaction is removed from the mixture by raising the temperature gradually to 150° C. and also maintaining the pressure at a value in the range from 0.1 to 10 millimeters of mercury. The pressure reduction may be abrupt or gradual providing excessively rapid evolution of water from the mixture, which is generally accompanied by spattering and other undesirable effects, is avoided. For the same reason, the increase in temperature of the reaction mixture should desirably be gradual. The maximum rate of increase in temperature of the mixture depends to some extent, however, upon the volume of the mass of liquid reaction mixture being heated and its physical form. For example, if the reaction mixture is in the form of a thin film, its temperature may be increased more rapidly than if it is in the form of a cubic or spherical mass. It is important that the maximum temperature to which the reaction mixture is heated during removal of the water of reaction should not exceed 210° C. in order to avoid the occurrence of chemical reactions different from the desired one. In addition, as soon as the amount of water of reaction removed is equal in molecular proportion to the amount of each of the reactants, the heating should be discontinued in order to avoid occurrence of further undesirable reactions leading to different products. The amount of product is accordingly the total amount which can be theoretically obtained according to the equation set forth above. The product appears in the form of a hard white solid.

The following example is intended to illustrate the invention more fully without acting as a limitation upon its scope.

EXAMPLE

There is a placed in a resin kettle fitted with a stirrer, thermometer, and dropping funnel 1640 grams of an approximately 85% aqueous solution containing 1390 grams of orthophosphoric acid (14.2 moles). There is placed in the dropping funnel 867 grams of 2-aminoethanol (Eastman Organic Chemical, 1597) (14.2 moles).

The 2-aminoethanol is then permitted to flow into the resin kettle while the phosphoric acid solution is stirred, the rate of flow being such that the temperature does not exceed about 70° C.

After all of the 2-aminoethanol has been mixed with the phosphoric acid solution, the kettle is connected to a vacuum system and the pressure reduced to approximately 10 millimeters of mercury, and the kettle is heated by means of a bath of liquid silicone, the temperature of which is increased gradually over a period of approximately two hours to 100° C. After two more hours at a temperature of about 100° C., all of the water of solution is removed and the remaining mixture weighs 2257 grams. When cooled to room temperature, the mixture crystallizes, forming a white solid having a melting point of 84–86° C.

After removal of the water of solution has been completed as described above, the temperature of the silicone bath is gradually increased to 210° C. over a period of approximately 180 minutes and the pressure is reduced to approximately 0.5 millimeter of mercury. Under these conditions, the ester is formed in accordance with the above equation, and the water of reaction which is liberated is removed by evaporation. During the course of this step of the process, the mixture solidifies near the end of the reaction. The reaction is complete when 14.2 moles of water of reaction (256 grams) have been removed.

The resulting product, weighing 2001 grams (100% of the theoretical yield), is in the form of a white hard solid which has a melting point of approximately 230-232° C. The product may be recrystallized from a small amount of water in the usual manner, the final product having a melting point of 240-242° C.

It will be appreciated that the reaction mixture need not be cooled to room temperature after the water of solution has been removed but instead the heating of the molten mixture may simply be continued and the temperature raised to the desired level without permitting the mixture to solidify beforehand.

Although a specific embodiment of the invention has been described herein, it is not intended to limit the invention solely thereto but to include all of the variations and modifications which suggest themselves to one skilled in the art and which are within the spirit and scope of the appended claims.

What is claimed is:

1. The method of making 2-aminoethyl phosphate which comprises mixing 2-aminoethanol with an aqueous solution of orthophosphoric acid in equimolar proportions, evaporating all the water of solution from the mixture at a temperature up to 110° C., then raising the temperature of the mixture to 150-210° C. while removing water of reaction from the mixture at reduced pressure, and discontinuing the heating when an equimolar proportion of water has been removed.

2. The method as claimed in claim 1 in which the aqueous solution of orthophosphoric acid contains approximately 85% acid by weight and the 2-aminoethanol is anhydrous.

3. The method as claimed in claim 2 in which the step of evaporating water of reaction is carried out at a pressure from 0.1 to 10 millimeters of mercury.

4. The method of claimed in claim 3 in which the step of evaporating water of solution is carried out of reduced pressure.

References Cited

UNITED STATES PATENTS 2,730,542   1/1956   Ferrari et al. _____ 260—978

CHARLES B. PARKER, Primary Exainer

R. L. RAYMOND, Assistant Examiner

U.S. Cl. X.R.

260—978

UNITED STATES PATENT OFFICE
CERTIFICATE OF CORRECTION

Patent No. 3,644,603　　　　　　　Dated February 22, 1972

Inventor(s) Perttu V. Laakso

It is certified that error appears in the above-identified patent and that said Letters Patent are hereby corrected as shown below:

Column 1, line 54, change "orthophopshoric" to --orthophosphoric--;

Column 2, line 39, before "placed" delete --a--;

Column 4, line 12, claim 4 change "of" to --as--;

Column 4, line 13, claim 4 change "of" (last occurrence) to --at--.

Signed and sealed this 5th day of September 1972.

(SEAL)
Attest:

EDWARD M. FLETCHER, JR.　　　　　　ROBERT GOTTSCHALK
Attesting Officer　　　　　　　　　Commissioner of Patents